Patented Apr. 27, 1943

2,317,752

UNITED STATES PATENT OFFICE 2,317,752

MODIFIED STARCH

Arthur D. Fuller, New York, N. Y., assignor to National Starch Products Inc., New York, N. Y., a corporation of Delaware No Drawing. Application October 30, 1939, Serial No. 301,946

5 Claims. (Cl. 127—33)

This invention relates to the manufacture of a new starch product which I term an "inhibited" starch and which is characterized by resembling raw starch but differing therefrom by its inherent ability to yield upon cooking in aqueous media, a "short," smooth and stable paste.

According to my invention, ordinary starch is modified so as to produce the "inhibited" starch. This "inhibited" starch in its uncooked state resembles ordinary raw, uncooked starch in both superficial and microscopic appearance, but upon heating in water to a temperature beyond the usual gelatinization point of the particular starch in question, gives a material in which the individual starch granules have become greatly swollen, but nevertheless have not burst, disintegrated or otherwise lost their identity as individual granules, in the manner in which ordinary, untreated starch granules lose their identity upon cooking. This "inhibited" starch gives, when cooked up, a material having entirely new and highly desirable properties which cause it to be suitable for numerous commercial applications.

It is well known that when ordinary raw starch is heated in sufficient water, a temperature is reached at which the suspension suddenly thickens to a relatively "short" paste (the particular viscosity depending upon the amount of water employed, and upon the type of starch). Microscopic examination shows that the starch granules have become swollen, although still identifiable as individual entities. As heating is continued, the material changes in character to a "long," rubbery, stringy mass, which cannot be easily handled, stirred, spread or divided, because of its unwieldy rubbery cohesiveness. Microscopic examination at this point shows that the starch cells are disintegrating, or in some manner losing their identity and merging with one another. The particular degree to which this transformation takes place depends upon the starch-type used. Thus, tapioca (cassava) or sago starches, when so cooked, will give "longer," more cohesive pastes than will corn or wheat starches. However, this general tendency is true of all starches. It is also well known that if the heating of this "long" material is continued, there occurs a comparatively rapid decrease in viscosity, apparently due to the breakdown of the starch structure. Agitation of the cooked starch will have the same thinning effect.

It has, of course, been well known to treat starches with oxidizing agents, for example, hydrogen peroxide, hypochlorite or hypobromite solutions, in order to produce what are ordinarily called "thin-boiling" starches. Such starches, as the name implies, cook up with water to give a thinner, less viscous material than the corresponding untreated starch. This is due to the fact that the granules of a thin-boiling starch undergo disintegration more readily and completely than those of the corresponding raw starch. The greater the degree of oxidation, the greater will be the decrease in viscosity of the corresponding starch cook-up. Because of their reduced viscosity, such oxidized starches cannot be considered in the same category as raw starches for many commercial purposes. It should be noted that thin-boiling starches generally have the characteristic, usually undesirable, that after having been cooked even in fairly dilute proportions, they will upon standing or cooling increase substantially in viscosity, or even set to a jelly-like mass.

By my invention there is produced a starch which, unlike untreated starch, may be cooked with water or the like to produce a smooth, "short," salve-like material relatively non-cohesive and easily spread or divided. It is furthermore highly resistant to breakdown in viscosity upon prolonged heating or agitation. It is generally more resistant to physical and chemical action than untreated starch. It may be produced, if desired, substantially as thick-boiling as untreated starch. Unlike the thin-boiling starches mentioned above, the product of my invention, after having been cooked in water, undergoes relatively little increase in viscosity upon standing or cooling.

I have found that an "inhibited" starch of the above properties may be produced by treating starch, in aqueous suspension, with an oxidizing agent, in the presence of any one of a number of materials which I shall name "reaction modifiers." For the oxidizing agent I prefer to use chlorine preferably obtained from the hypochlorite such as sodium hypochlorite. I have found that numerous materials are effective as the reaction modifier in this process, for example, acetamide, formamide, hexamethylenetetramine, urea, ureides and their derivatives, ammonia and ammonium salts, cyclohexylamine, p-toluenesulfonamide, sulfamic acid and sulfamates, ethylene diamine, aniline, glucosamine, cyanides, thiocyanates, phenol, hydroquinone, quinhydrone, and sodium ortho-phenyl phenate, also gelatin, animal glue, wheat protein, and other vegetable and animal proteins. As will be seen from the above list of suggested reaction modifiers, these may be organic or inorganic, aliphatic or aromatic, and it has not been found necessary that they have any one particular type of structure or linkage of elements.

It will be noted that vegetable proteins are suggested as suitable reaction modifiers. It is known that in starch-containing plants there is frequently present a substantial amount of natural protein matter. It is possible in the manufacture of starch to allow a certain amount of such vegetable protein to be left with the starch. In other words, the reaction modifier may be added to the starch as an extraneous material, or it may be left in the starch as residual protein. My invention covers both these methods of associating the starch with the reaction modifier.

As the oxidant in this process, I have found a halogen-containing body, for example sodium-hypochlorite, to be particularly effective.

By treating starch with oxidizing agents in the presence of the proper amount of a suitable reaction modifier one does not obtain a thin-boiling starch, as would be the case if the reaction modifier were not present. On the contrary, the material may, if desired, be produced within the viscosity range of ordinary untreated starches. Yet, even when washed entirely free of extraneous material, and cooked in aqueous media, it exhibits the remarkable properties previously referred to; namely, instead of forming a "long" cohesive, unwieldy and unstable mass, it produces a "short," smooth, salve-like, non-stringing product which is resistant to breakdown in viscosity upon either prolonged heating or agitation, and which retains its character without substantial alteration upon storage for long periods of time, even for several weeks.

The process of treating starch with an oxidizing agent in the presence of a reaction modifier to produce an "inhibited" starch of the type described, and the product so obtained, namely, a starch resembling raw starch in superficial and microscopic appearance, but which may be heated in aqueous media to form a paste whose qualities of "shortness," smoothness and stability are far superior to pastes of the untreated starch, comprise the essence of my present invention.

By the proper selection of materials and treatment, the product of my present invention may be obtained in exceedingly pure and edible form, which together with the qualities of "shortness," non-stringing and smoothness gives it great importance in the manufacture of starch foods, such as puddings, pie fillings, salad dressings, desserts, condiments and similar products. These qualities together with its stability, resistance to breakdown and jelling, and the narrow spread between the hot and cold viscosities of its pastes, make such a product valuable in the textile industry, for use in warp sizing, weighting and in printing pastes for the various types of dyes. It is also of value as a paper size and as an adhesive. Because of its unique qualities, such an "inhibited" starch finds numerous other applications in industry.

I am not able to offer a precise explanation which can account clearly for the remarkable effect of the "reaction modifiers" in combination with oxidizing agents, upon starch. However, some evidence leads to the belief that the exterior and interior portions of the starch granule have in some manner undergone a relative change in strength, or toughness, so that the wall of the granule can withstand various strains or forces without being disrupted. It should be noted that while the granules may become tougher, they do not appear to lose in elasticity. Microscopic examination during the early stages of heating in water shows that the "inhibited" starches of the present invention swell similarly in degree with the corresponding raw starches. In the case of raw untreated starch, however, as the temperature increases the starch granules continue to swell and finally disintegrate until practically no structure can be discerned through the microscope. On the other hand, at this same stage of heating, the treated starch granules of the present invention are greatly distended but not disintegrated; examination through crossed Nicols no longer shows the typical polarization crosses, but the individual starch grains can still be clearly distinguished. The walls have not been disrupted. The treated starch reaches a temperature at which the swelling appears to be limited. The more highly "inhibited" the starch, the lower is the temperature at which this limitation occurs. Highly "inhibited" starches are therefore lower in viscosity than untreated starches, but are nevertheless distinctly different types than ordinary thin-boiling starches, whose thinness is due to disintegration of the granules rather than to limited swelling. Of course, as in any modification of starch, every granule is not affected in exactly the same degree. This extraordinary resistance of the granules may account for the stability of this product against breakdown in viscosity upon prolonged heating or agitation. This toughness may also account for the "shortness" of the pastes, in the sense that the toughness of the individual starch granules prevents their agglutination to one another, so that the material is smooth and non-cohesive.

I have found that in certain cases, the addition of bromides, chromium salts or other chemicals is advisable in regulating the reaction. Similarly adjustments in pH have a controlling effect on the reaction.

Although the nature of this invention is such that an extremely large number of examples could be given to present all the possible modifications, the following examples will suffice to illustrate the principles involved and to show how the invention is practiced.

EXAMPLE I 1000 parts of high grade tapioca starch, 1200 parts water and 5 parts urea (reaction modifier) are stirred together. There are then added 93.6 parts of a sodium hypochlorite solution (the oxidant) containing 5.34% available chlorine and 2.1% free NaOH. The hypochlorite is added over a period of one hour. There are thus present 0.5% urea and 0.5% available chlorine, based on the starch. All of the parts mentioned herein and in subsequent examples are parts by weight. The mixture is allowed to react overnight. Sufficient sodium bisulphite is then added to remove any excess available chlorine.

A sample ("A") taken at this point, diluted with sufficient water to produce a mixture containing 15 parts of water per one part of starch, and cooked, gives a smooth paste of the "inhibited" characteristics previously described.

The balance of the starch milk, from which excess available chlorine has been removed, is then adjusted to pH 6.5, as with hydrochloric acid. A second sample ("B") taken at this point and cooked up in the same manner as the previous sample, also gives an "inhibited" product.

The balance of the material is then filtered, washed, put through a wire screen, again washed and refiltered. The material is then centrifuged and dried in an air current to normal moisture (10–15%). A sample ("C") of this pure, dry material, cooked with 15 parts water, gives a well "inhibited" product. It resembles ordinary clean, raw starch in appearance, and when viewed through crossed Nicols it shows the typical polarization crosses. However, when cooked with water it yields a smooth, non-cohesive, salve-like paste of the characteristics already described. The material is free of any objectionable odor or taste, and is edible.

The fact that samples "A" and "B" give "inhibited" products, indicates that it is not necessary to go through the steps of washing, filtering, drying, etc. in order to obtain the "inhibited" starch of this invention. For some industrial applications, the latter steps are unnecessary. If it is desired to pack and sell the material in a dry form, the milk may be filtered and the starch dried, or when it is desired to have a pure, edible product, free of extraneous materials, tastes or odors, such a product may be produced in the manner of sample "C."

The above example if repeated, but without adding a reaction modifier, produces an ordinary thin-boiling starch.

Example II 1000 parts of sago starch are mixed with 1250 parts of water to form a starch milk. 80 parts of soya bean protein (the reaction modifier) are then added. The pH of the milk is brought to 7. Then 200 parts of a sodium hypochlorite solution (the oxidant) are added, containing 5% available chlorine and no free NaOH. There are thus present 8% soya bean protein and 1% available chlorine, based on the weight of the starch. The sodium hypochlorite is added all at once, and the material is allowed to react, with agitation, for 24 hours. Excess available chlorine is then removed, the pH value adjusted to 6.5, the starch filtered, washed and dried as in Example I. The product so obtained has the "inhibited" characteristics previously described.

Example III 1000 parts of potato starch are mixed with 1250 parts of water, and 10 parts of acetamide (reaction modifier) and 6 parts of sodium bromide (auxiliary regulating agent) are added. After mixing, there are added 80 parts of a sodium hypochlorite solution (oxidant) containing 5% available chlorine and 1.75% free NaOH. There are thus present 1% acetamide, 0.6% sodium bromide and 0.4% available chlorine, based on the weight of the starch. The hypochlorite is added over a period of ½ hour, and the mixture allowed to react for 6 hours longer. Excess available chlorine is then removed, the pH adjusted to 6.5, the starch filtered, washed and dried as in Example I. The product is an "inhibited" potato starch of the general characteristics described.

Example IV 1000 parts of corn starch are mixed with 1500 parts water and 5 parts of chrome glue added (the glue having been first dissolved in water). Then 125.7 parts of a sodium hypochlorite solution are added, containing 4.77% available chlorine and 2.0% free NaOH. There are thus present 0.5% chrome glue and 0.6% available chlorine, based on the weight of the starch. The hypochlorite is added over a period of one hour, and the reaction allowed to continue for 20 hours longer. The starch is then finished as in previous examples. The product is an "inhibited" corn starch of the general characteristics described.

Example V 1000 parts of tapioca starch, 1200 parts water, and 5.0 parts cyclohexylamine are stirred together. Then over a period of one hour, 84.2 parts of a sodium hypochlorite solution containing 4.83% available chlorine and 2% free NaOH are added. There are thus present 0.5% cyclohexylamine and 0.4% available chlorine, based on the weight of the starch. This mixture is allowed to react overnight, and is then finished as in previous examples. The product has the generally "inhibited" characteristics described.

Example VI 1000 parts tapioca starch, 1200 parts water, 10 parts p-toluenesulfonamide, and 4 parts sodium bromide (auxiliary regulating agent) are mixed together, and 103.4 parts of a sodium hypochlorite solution containing 4.83% available chlorine and 2% free NaOH are added, over a period of one hour. There are thus present 1% of p-toluenesulfonamide and 0.5% available chlorine, and 0.4% sodium bromide based on the weight of the starch. This mixture is allowed to react overnight, and is then finished as in previous examples. The product has the generally "inhibited" characteristics described.

Example VII 1000 parts of tapioca starch, 1200 parts of water and .078 part of potassium cyanide are stirred together, and 26 parts of sodium hypochlorite containing 4.81% available chlorine and 2.4% free NaOH are added over a period of about 5 minutes. There are thus present .0078% potassium cyanide and 0.125% available chlorine, based on the starch. The reaction is allowed to continue for about 18 hours. The excess available chlorine is then removed by the addition of sufficient sodium bisulphite, the product adjusted to pH 6.5, filtered and washed as usual. A well "inhibited" product is produced.

Example VIII 1000 parts of tapioca starch, 1200 parts water and 2.5 parts potassium thiocyanate (KCNS) are stirred together. Then 53 parts of a sodium hypochlorite solution containing 4.75% available chlorine and 2% free NaOH are added slowly, over a period of one hour. The mixture thus contains 0.25% KCNS and 0.25% available chlorine, based on the weight of the starch. This is allowed to react overnight, and is finished as in the previous examples. The product is "inhibited" in the manner described.

Example IX 1000 parts of a high grade tapioca starch are mixed with 1000 parts water at room temperature, producing a starch milk. To this are added 3.75 parts gelatine (reaction modifier). Then there are added 80 parts of a sodium hypochlorite solution (oxidant) containing 5% available chlorine and 1.75% free NaOH. There are thus present 0.375% gelatine and 0.4% available chlorine, based on the weight of the starch. The hypochlorite is added slowly, over a period of one hour. The material is then agitated for 12 hours. At the end of this period, any excess available chlorine is removed by the addition of a sufficient amount of sodium bisulphite. The pH value is adjusted to 5.0 and the milk is run through wire screens, filtered, washed on the filter, remixed with water, again filtered, then centrifuged and dried. The product resembles ordinary clean raw starch in appearance and when viewed through crossed Nicols it shows the typical polarization crosses. However, when cooked with water it yields a pure, smooth, non-cohesive, salve-like paste of the characteristics already described.

Example X 1000 parts of a high grade tapioca starch are mixed with 1200 parts water at room temperature. To this are added 0.625 part phenol (reaction modifier) and 49 parts of a sodium hypochlorite solution (oxidant) containing 5.1% available chlorine and 2.1% free NaOH. There are thus present $\frac{1}{16}$% phenol and $\frac{1}{4}$% available chlorine based on the weight of the starch. The hypochlorite is added over a period of one hour, and the material is then agitated for twelve hours. At the end of this period, any excess available chlorine is removed by the addition of a sufficient amount of sodium bisulphite. The product is filtered and washed as usual. A well "inhibited" product is produced.

Example XI 1000 parts of a high grade tapioca starch are mixed with 1200 parts of water. To this milk are added 2.5 parts of sodium ortho-phenyl phenate (reaction modifier) and 49 parts of a sodium hypochlorite solution (oxidant) containing 5.1% available chlorine and 2.1% free NaOH. There are thus present $\frac{1}{4}$% of the sodium ortho-phenyl phenate and $\frac{1}{4}$% available chlorine. The hypochlorite is added over a period of about one hour, the material agitated for twelve hours, excess available chlorine removed by the addition of sufficient sodium bisulphite, and the material filtered and washed as usual. A well "inhibited" product is produced.

It has been stated previously in this application that one of the remarkable features of the product of my invention is the resistance to breakdown of its pastes upon prolonged heating or agitation. This quality may be vividly demonstrated by viscosimetric tests. The following data were obtained by testing the product prepared as in Example IX, using a Stormer viscosimeter, such as supplied by the Arthur H. Thomas Co., Philadelphia, Pa. Similar tests were made on a sample of untreated starch. "Time of revolution," in the following tables, refers to the time in seconds for an inverted cup driven by a 450 g. weight to make 100 revolutions through a paste made by cooking the starch product in water and cooling to 23° C. A lowered "Time of revolution" means that the resistance to the motion of the cup has decreased, or in other words that the viscosity has decreased. In making the pastes, sufficient water was used so that the "Time of revolution" after the first ten minutes cooking would be approximately the same for both the treated and untreated starch. Table "A" shows the resistance of the pastes to continued heating. Table "B" shows the resistance of the pastes to continued agitation.

Table A

*"Time of revolution" after cooking at 95° C. for various periods*

| Period of cooking | 10 min | 20 min | 1 hr | 2 hrs | 3 hrs |
|---|---|---|---|---|---|
| Time of rev. untreated tapioca starch | 43.4 sec | 19.4 sec | 7.8 sec | 7.4 sec | 5.6 sec |
| Time of rev. "inhibited" tapioca starch as of Example IX | 39.4 sec | 44.2 sec | 36.8 sec | 34.0 sec | 32.8 sec |

The uniformity in viscosity readings upon prolonged cooking, and hence the great stability of the "inhibited" starch will be noted from the above table. Note for example that after three hours cooking the paste of the product of my invention showed a Stormer Viscosimeter reading of 32.8 sec., whereas the paste of untreated starch had broken down to a point where it only gave a reading of 5.6 sec.

Similarly great stability on the part of the "inhibited" starch and similarly precipitous decreases in viscosity, upon cooking, of raw starch paste were found, using widely varying proportions of water in making up the pastes.

The resistance of the material of my invention to breakdown in viscosity upon agitation of its pastes may also be demonstrated by the use of the Stormer viscosimeter. In preparing the data shown in Table "B," samples were taken of the untreated and of the treated starch pastes in Table "A" under the heading "10 min." Then the cup was allowed to continue to revolve, and the time in seconds required for each subsequent 100 revolutions was recorded. Decreasing values here indicate that the viscosity of the material is breaking down upon continued agitation, causing the cup to complete its 100 revolutions more rapidly. The data follows:

Table B

*Stormer viscosity (time of revolution) on continued stirring. Paste cooked ten minutes as in Table A*

| | 100 revolutions, time of— | | | | |
|---|---|---|---|---|---|
| | 1st | 2nd | 3rd | 4th | 5th |
| Untreated tap. starch seconds | 43.4 | 36.2 | 32.8 | 30.4 | 28.2 |
| "Inhibited" tap. starch (Example IX) seconds | 39.4 | 41.8 | 43.2 | 45.0 | 45.8 |

It is to be noted that between the 1st and the 5th stirring, untreated starch dropped in viscosity from 43.4 sec. to 28.2 sec., whereas similar treatment actually increased the viscosity reading of the material of any invention from 39.4 sec. to 45.8 sec.

Experience with very many "reaction modifiers," and with varied percentages of oxidant, has proven the importance of using the proper proportion of reaction modifier relative to the starch, also the proper proportion of oxidant relative to the starch, and especially the proper proportions of these materials relative to each other, in order to obtain the product of this invention. For a given reaction modifier and a given starch, there is a definite range of percentages of oxidant which may be used. Outside of these limits, good results will not be obtained, regardless of the proportion of reaction modifier employed. However, for any particular percentage of a given oxidant within these limits there is a particular range of percentages of a given reaction modifier which will be effective. If the amount of the reaction modifying material is outside this range, the desired effect will not be obtained. Each percentage of oxidant may call for a different effective range of reaction modifier.

It will thus be seen, firstly, that the use of the proper proportions of chemicals is of vital importance to the successful practice of this invention, and secondly that because of the almost countless variables involved, it is impossible actually to list all the working ranges of proportions for all the possible reaction modifiers and all the possible amounts of oxidant for every type of starch.

In demonstration of the great variation in range of proportions for any one modifier with varying percentages of a particular oxidant, I list below the working range as well as the optimum range of urea which may be used with various amounts of chlorine (as a solution of sodium hypochlorite containing 5% available chlorine and 2% free NaOH) on tapioca starch. All percentages are based on the weight of the starch.

Working range of available chlorine___ 0.125 to 3 Per cent
Optimum range of available chlorine_ 0.25 to 0.5

| Percent available chlorine | Working range urea | Optimum range urea |
|---|---|---|
| | Percent | Percent |
| 0.25 | 0.125-2 | 0.25-1 |
| 0.5 | 0.25-4 | 0.25-1 |
| 1 | 0.25-6 | 0.5-3 |
| 2 | 2-8 | 2-8 |
| 3 | 2-9 | 2-9 |

In this case, therefore, the best quality product would be produced using 0.25% to 0.5% available chlorine, with 0.25% to 1% urea.

Using the same chemicals as above, but on corn starch, 0.5% available chlorine is effective with urea ranging from 0.06% to 2%, as compared with a working range of 0.25% to 4% urea with tapioca starch. While this does not constitute sufficient data for broad conclusions it does indicate that the range with corn starch is appreciably lower than when treating tapioca starch.

When animal glue is used as the reaction modifier on tapioca starch, with chlorine (as available chlorine in sodium hypochlorite) as the oxidant, quite different ranges of proportions are indicated. As in the case of urea, it is possible to obtain an "inhibited" starch with glue, using as little as 0.125% available chlorine based on the weight of the starch. In the case of urea, however, a desirable product could not be obtained when appreciably more than 3% available chlorine was employed, regardless of the proportion of reaction modifier present. When animal glue is used as the reaction modifier, the upper limit of chlorine which may successfully be used is so high that I have not been able to determine it precisely. Even using as high as 8% available chlorine based on the starch, together with 8% of animal glue, an excellent "inhibited" starch was obtained.

The following data illustrate the varying ranges of glue which may be used with various proportions of chlorine. All percentages are based on the weight of the starch.

| Per cent available chlorine | Working range glue | Optimum range glue |
|---|---|---|
| | Per cent | Per cent |
| 0.125 | 0.03-2 | 0.125-0.5 |
| 0.25 | 0.06-4 | 0.25 -1 |
| 0.5 | 0.3 -8 | [1]0.5 -2 |
| 1.0 | 0.5 -16 | 0.5 -8 |
| 3.0 | [1]1.0 -8 | [1]1.5 -8 |
| 5.0 | [1]1.5 -8 | [1]3 -8 |

[1] This is not the actual upper limit, but merely indicates that a successful product was obtained with this proportion. Higher amounts were not attempted.

It should be strongly emphasized that all the above percentages are approximate. I do not wish to be construed as limiting my invention in any way thereby, since they are presented merely by way of illustration. For example, the mere use of a different grade of animal glue or a change in some other condition of the experiment would result in a change in the figures.

These illustrative ranges are listed in order to demonstrate the necessity of using the proper proportions, and to emphasize the difference in ranges of proportions as the variables are shifted. Neither a general lower limit which will be applicable to all reaction modifiers nor an upper limit can be assigned. In this connection note that in Example VII .0078% of potassium cyanide on the starch gave an excellent product. In fact, half this amount, or .0039% gave a moderately "inhibited" product. On the other hand, as much as 16% of animal glue caused "inhibition" of starch, and this is by no means the upper limit of reaction modifier which may cause inhibition. Other reaction modifiers have been found which approach potassium cyanide in efficiency, as well as some which must be used in relatively large proportions in order to cause the desired modification.

Another variable factor should be mentioned in this connection, namely, the degree of "inhibition" desired. The degree to which one wishes to convert the original raw starch from its usual characteristics to the new characteristics which we have herein termed "inhibited" that is, to a smooth, non-stringing, salve-like material which is stable to cooking and agitation, and possessing the other qualities previously described, depends upon the particular use to which the product is to be put. And this degree of inhibition is of course determined for any particular starch by controlling the proportions of oxidant, reaction modifier, auxiliary agents, pH, time of reaction, temperature, concentration, etc.

Although the examples which have been given herein refer to the operations of filtering, washing and drying the product, these cannot be considered essential steps. It is feasible to treat starch with an oxidant in the presence of a reaction modifier, as demonstrated in the examples, and then to use the resultant milk, with the necessary dilution, directly in a commercial nonedible process without the subsequent steps of filtering, drying, etc. It would be desirable to remove any remaining available chlorine by the addition of sufficient sodium bisulphite. The intensity of the washing depends on the degree of purity desired in the finished product. Thus, for food purposes, a more thorough washing is necessary than in other applications. The procedural details would be varied therefore, in accordance with the application to which the product is to be put. Similarly, the pH value of the final product can be adjusted to meet the requirements of the ultimate application.

In its essence, my invention lies in the production of a new product, namely, a starch which resembles raw starch in superficial and microscopic appearance but which, when cooked in aqueous media, yields a "short," smooth, salve-like stable paste, representing a substantial improvement over the corresponding untreated starch. Similarly, the invention comprises such a new product produced by treating starch with an oxidant in the presence of a reaction modifier. I have named certain preferred materials and methods. These are given by way of exemplifying but not by way of limiting the principle of this invention, namely, the oxidation of starch in the presence of subsidiary materials which will have the effect of modifying the reaction and altering the properties of the starch in the manner described.

I am aware that it has been proposed to add chemicals to starch in order to retard the disintegration of the starch granules when the starch-chemical mixture is subjected to paste-forming conditions. By such a process, the swelling and disintegration of the starch is limited only so long as it remains in contact with the added retarding chemicals. It has also been proposed to dry this partially swollen product. It is evident that this in no way parallels or teaches the method of my invention, neither does it produce a comparable product. If the added retarding chemical is removed from such a product it is no longer retarded and the starch granules will swell, disintegrate and otherwise act in the manner of ordinary untreated starch, under paste-forming conditions such as cooking, alkali treatment, and addition of various chemicals in aqueous solution. I claim as novel, the method of treating starch with oxidants in the presence of reaction modifiers, so that even upon the removal of extraneous materials, the resultant starch will inherently have the remarkable "inhibited" properties previously described. Furthermore, I claim novelty in the product of this invention, a product which may be produced to resemble raw starch in superficial appearance and on microscopic examination, in that even when viewed through crossed Nicol prisms the typical polarization crosses are clearly visible, and which may be washed free of extraneous materials to a state of high purity and still be thereafter cooked in aqueous media to yield a "short" salve-like material of the properties described. In brief, the product of this invention is so modified that it acts in the absence of extraneous substances as though disintegration inhibitors were present. Because the product of my invention can be entirely freed from the reaction modifiers, oxidants, their inter-reacting products, and other extraneous substances, and yet continue to possess the remarkable "inhibited" properties herein described, I am able to produce an edible "inhibited" starch product of the highest purity, free of any objectionable odor or taste, having great value in food preparation. I refer to this as a starch product which has been "inherently inhibited;" that is, its "inhibited" characteristics do not depend on the presence of any extraneous materials. An "inhibited" pure edible starch of this type was obviously not obtainable by the prior methods mentioned above, since in the very process of purification and removal of extraneous materials the desired "inhibited" qualities would be lost.

In this application, the term "starch" has been used generically and is meant to include starches of all types as well as all qualities. The particular reagents, proportions and working details may be varied to achieve the optimum results with the particular starch type at hand, and these factors may be similarly varied in treating lower or higher grades of a starch.

The term "inhibited" has been employed only in the sense described herein, namely, the treatment of a starch to retard the bursting and disintegration of an appreciable number of its granules (this being a dominant characteristic) under conditions wherein the corresponding untreated starch granules do so burst and lose their identity. In speaking of an "inhibited" starch, I therefore refer to one so treated, and which has, therefore, acquired the pursuant qualities fully described herein. The paste of an inhibited starch has at least an appreciable proportion of the starch granules undisintegrated.

Similarly, by "reaction modifier" I mean only those materials which are effective when used in connection with the oxidant, to inhibit starch. The reaction modifiers may in some cases include auxiliary regulating agents such as bromides, chromium salts or other chemicals which function to enhance or limit the inhibiting action of the reaction modifiers.

While in the examples given I have used chlorine as the oxidant, it will be apparent that other oxidants may be used which are equivalents thereto.

The product of this invention can be dextrinized, drum dried, or otherwise converted, treated, or mixed with other materials.

What I claim is:

1. A modified starch consisting of starch granules characterized by resembling raw starch in superficial and microscopic appearance but differing therefrom by inherently yielding upon prolonged cooking in aqueous media a short, smooth and viscosity stable paste, said starch granules consisting of raw starch particles reacted in an aqueous suspension with related proportions of a chlorine oxidizing agent and an inhibiting agent acting to modify the oxidation reaction of the chlorine oxidizing agent.

2. A modified starch consisting of starch granules characterized by resembling raw starch in superficial and microscopic appearance but differing therefrom by inherently yielding upon prolonged cooking in aqueous media a short, smooth and viscosity stable paste, said starch granules consisting of raw starch particles reacted in an aqueous suspension with a chlorine oxidizing agent in the presence of a nitrogenous body acting to modify the oxidation reaction of the chlorine oxidizing agent.

3. A modified starch consisting of starch granules characterized by resembling raw starch in superficial and microscopic appearance but differing therefrom by inherently yielding upon prolonged cooking in aqueous media a short, smooth and viscosity stable paste, said starch granules consisting of raw starch particles reacted in an aqueous suspension with a hypochlorite in the presence of an inhibiting agent acting to modify the oxidation reaction of the hypochlorite.

4. A modified starch consisting of starch granules characterized by resembling raw starch in superficial and microscopic appearance but differing therefrom by inherently yielding upon prolonged cooking in aqueous media a short, smooth and viscosity stable paste, said starch granules consisting of raw starch particles reacted in an aqueous suspension with related proportions of sodium hypochlorite and a nitrogenous compound.

5. A modified root starch consisting of root starch granules characterized by resembling raw starch in superficial and microscopic appearance but differing therefrom by inherently yielding upon prolonged cooking in aqueous media a short, smooth and viscosity stable paste, said root starch granules consisting of raw starch particles reacted in an aqueous suspension with related proportions of a chlorine oxidizing agent and an inhibiting agent acting to modify the oxidation reaction of the chlorine oxidizing agent.

ARTHUR D. FULLER.